US012759291B2

(12) United States Patent
Yumoto et al.

(10) Patent No.: US 12,759,291 B2
(45) Date of Patent: Oct. 13, 2026

(54) RECORDING DEVICE

(71) Applicant: SEIKO EPSON CORPORATION, Tokyo (JP)

(72) Inventors: Yuya Yumoto, Shiojiri (JP); Naohiro Ueyama, Matsumoto (JP); Fusao Ohashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 55 days.

(21) Appl. No.: 19/001,727

(22) Filed: Dec. 26, 2024

(65) Prior Publication Data

US 2025/0214337 A1 Jul. 3, 2025

(30) Foreign Application Priority Data

Dec. 29, 2023 (JP) ................................ 2023-223788

(51) Int. Cl.

| | |
|---|---|
| ***B41J 29/377*** | (2006.01) |
| ***B41J 2/14*** | (2006.01) |
| ***B41J 3/407*** | (2006.01) |
| ***B41J 11/00*** | (2006.01) |

(52) U.S. Cl.

CPC ............... *B41J 2/14* (2013.01); *B41J 3/4078* (2013.01); *B41J 11/002* (2013.01); *B41J 29/377* (2013.01); *B41J 2002/14491* (2013.01)

(58) Field of Classification Search

CPC .................... B41J 11/002; B41J 29/377; B41J 2002/14491

See application file for complete search history.

(56) References Cited

U.S. PATENT DOCUMENTS 7,753,481 B2 * 7/2010 Kawamata ............. B41J 2/1752 347/37

FOREIGN PATENT DOCUMENTS

| | | | | |
|---|---|---|---|---|
| JP | 3818027 B2 * | 9/2006 | | |
| JP | 3845970 B2 * | 11/2006 | | |
| JP | 2020-001304 A | 1/2020 | | |
| TW | I245470 B * | 12/2005 | ............. | H01R 12/79 |

* cited by examiner

*Primary Examiner* — Sharon Polk
(74) *Attorney, Agent, or Firm* — Dority & Manning, P.A.

(57) ABSTRACT

A recording device 1 includes a recording section 50 configured to perform recording on a medium 2 while making reciprocal movement in a width direction, which intersects a transport direction F of the medium 2, a first control board 3 configured to control an operation of the recording section 50, a second control board 4 that is disposed between the first control board 3 and the recording section 50 and that is configured to relay a signal from the first control board 3, and a wiring section 7 that is configured to electrically connect the recording section 50 and the second control board 4 and that includes a U-shape portion T where posture is changed in accordance with the movement of the recording section 50 and a no displacement portion 8 where posture does not change in accordance with the movement of the recording section 50, wherein the second control board 4 is disposed in the no displacement portion 8.

6 Claims, 4 Drawing Sheets

RECORDING DEVICE

The present application is based on, and claims priority from JP Application Serial Number 2023-223788, filed Dec. 29, 2023, the disclosure of which is hereby incorporated by reference herein in its entirety.

BACKGROUND

1. Technical Field

The present disclosure relates to a recording device.

2. Related Art

An example of this type of device is the printing device described in JP-A-2020-1304. In JP-A-2020-1304, the following is described.

A first flexible flat cable and a second flexible flat cable are provided as flexible flat cables for electrically connecting a reciprocally moving print head and a main board. The control section controls the ejection state of liquid from the print head by a control signal transmitted to the print head via the second flexible flat cable. The print head is also referred to as a recording head hereinafter.

In order to accurately transmit a drive signal of the recording head from the main board to the recording head, it is necessary to install a drive board (DRV board) between the main board and the recording head. In other words, it is desirable to dispose the drive board at a position close to the recording head because the drive signal undergoes attenuation if the drive board is positioned remote from the recording head.

When the drive board is installed on the upper portion of a carriage that moves the recording head, a cooling process section is required to avert heat generated by the drive board from being transmitted to the recording head. When the drive board and the cooling processing section are added to the carriage, the size of the carriage increases. That is, there arises a problem in that a head unit constituted by the recording head and the carriage increases in size as a whole and also increases in weight. The increase in weight leads to an increase in power for moving the head unit. However, there is no description in JP-A-2020-1304 which considers the above problem.

SUMMARY

In order to solve the above problem, the recording device according to this disclosure includes a recording section configured to perform recording on a medium while making reciprocal movement in a width direction, which intersects a transport direction of the medium; a first control board configured to control an operation of the recording section; a second control board that is disposed between the first control board and the recording section and that is configured to relay a signal from the first control board; and a wiring section that is configured to electrically connect the recording section and the second control board and that includes a displacement portion whose posture changes in accordance with the movement of the recording section and a no displacement portion whose posture does not change in accordance with movement of the recording section, wherein the second control board is disposed at the no displacement portion.

DESCRIPTION OF EMBODIMENTS

Figure 1:
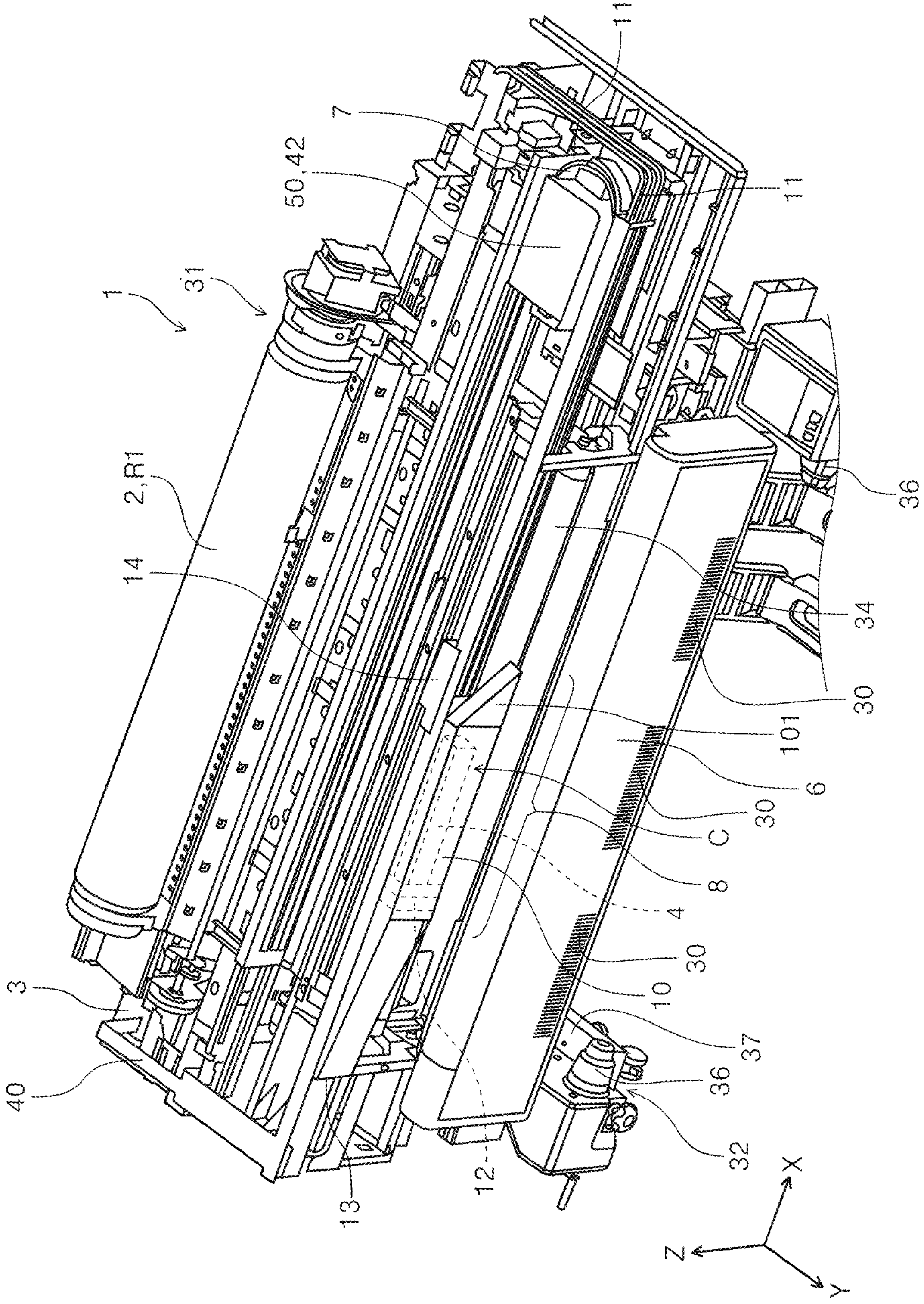
FIG. 1 is an overall perspective view of a recording device according to a first embodiment.

The present disclosure will first be schematically described below.

A first aspect of a recording device according to the present disclosure includes a recording section configured to perform recording on a medium while making reciprocal movement in a width direction, which intersects a transport direction of the medium; a first control board configured to control an operation of the recording section; a second control board that is disposed between the first control board and the recording section and that is configured to relay a signal from the first control board; and a wiring section that is configured to electrically connect the recording section and the second control board and that includes a displacement portion whose posture changes in accordance with the movement of the recording section and a no displacement portion whose posture does not change in accordance with movement of the recording section, wherein the second control board is disposed at the no displacement portion.

According to the present aspect, the second control board is disposed in the no displacement portion where the posture does not change even when the recording section of the wiring section moves. As a result, since the second control board is not disposed on the carriage that moves the recording head, it is possible to suppress an increase in the size of the recording head portion. The second control board is disposed in the no displacement portion where the posture of the wiring section does not change even when the posture of the wiring section is repeatedly changed due to the reciprocal movement of the recording head. That is, the second control board is disposed at a position where the posture of the wiring section does not change. As a result, it is possible to prevent the wiring section from colliding with the second control board due to the reciprocal movement of the recording section, thereby preventing it from broking down.

A second aspect of the recording device according to the present disclosure is an aspect according to the first aspect, further includes a heating section configured to heat the medium on which recording was performed by the recording section and a duct that communicates with outside air, that includes a fan, and that is positioned above the heating section, wherein the second control board is disposed inside the duct and the air sent by the fan is discharged downward.

According to the present aspect, the second control board is disposed inside the duct positioned above the heating section, and the air sent by the fan is discharged downward where the heating section is disposed. As a result, it is possible to cool the heating section positioned downward, and it is possible to suppress an increase in the temperature of an outer surface of the heating section.

Since the air sent by the fan is discharged toward the downward, the air can play an auxiliary role in drying the medium.

Since the second control board is disposed inside the duct, there is little possibility of ink mist adhering thereto and contaminating.

A third aspect of the recording device according to the present disclosure is an aspect according to the first aspect, wherein the second control board is disposed at the center of a range in which the recording section moves reciprocally.

Note that the present aspect may be dependent on the second aspect.

According to the present aspect, the second control board is disposed at the center of the range in which the recording section moves reciprocally. The center is a position closest to the recording head in the range in which the recording head moves reciprocally. As a result, attenuation of the drive signal transmitted from the second control board via the wiring section can be suppressed.

A fourth aspect of the recording device according to the present disclosure is an aspect according to the first aspect, further includes an ink tube that is connected to the recording section and that is configured to supply ink to the recording section, wherein the ink tube is fixed at the no displacement portion and changes posture together with the wiring section in accordance with the movement of the recording section at a portion between the no displacement portion and the recording section.

Note that this aspect may be dependent on the second aspect or the third aspect.

According to the present aspect, in the ink tube, is fixed at the no displacement portion and changes posture together with the wiring section in accordance with the movement of the recording section at a portion between the no displacement portion and the recording section. As a result, it is possible to use the no displacement portion also as a base end section of the ink tube where posture is not changed, the posture of the ink tube being changed due to the reciprocal movement of the recording section.

A fifth aspect of the recording device according to the present disclosure is an aspect according to the first aspect, further includes a heat insulating material disposed between the second control board and the heating section.

Note that the present aspect may be dependent on any one of the second aspect to the fourth aspect.

According to the present aspect, the heat from the heating section can be prevented from being transferred to the second control board by the heat insulating material.

A sixth aspect of the recording device according to the present disclosure is an aspect according to the first aspect, wherein the second control board is disposed on a front surface side of the recording device.

Note that the present aspect may be dependent on any one of the second aspect to the fifth aspect.

According to the present aspect, since the second control board is disposed on the front surface side of the recording device, it is easy to access the second control board when the second control board is replaced or the like.

EMBODIMENTS

Hereinafter, embodiments of a recording device according to the present disclosure will be described based on FIG. 1 to FIG. 4.

In the following description, three axes orthogonal to each other are referred to as an X-axis, a Y-axis, and a Z-axis, respectively, as shown in the drawings. The direction indicated by the arrows of the three axes (X, Y, Z) is the +direction of each direction, and the opposite direction is the −direction. The Z-axis direction corresponds to a vertical direction, that is, a direction in which gravity acts, a +Z direction indicates a vertically upward direction, −Z direction indicates a vertically downward direction. The X-axis direction and the Y-direction axis correspond to a horizontal direction. A +Y direction indicates a front direction of the recording device and a −Y direction indicates a rear direction of the device. A +X direction indicates a right direction of the device and a −X direction indicates a left direction of the device.

First Embodiment

A recording device of a first embodiment is referred to as a digital textile printing machine in which a medium is fabric. In this recording device, an appropriate tension is applied to the fabric by a transporting system called a Roll to Reel transporting system so that a recording range is in a floated state. After recording, the medium is heated and dried by a heating section disposed in a transport path and is wound by the winding section.

Hereinafter, the recording device of the present embodiment will be specifically described.

As shown in FIG. 1 to FIG. 4, a recording device 1 of the present embodiment includes a recording section 50 that performs recording on a medium 2 while reciprocally moving in the X-axis direction, which is the width direction, which intersects a transport direction F (FIG. 4) of the medium 2. The recording device 1 further includes a first control board 3 that controls the operation of the recording section 50, and a second control board 4 that is disposed between the first control board 3 and the recording section 50. The second control board 4 relays a drive signal from the first control board 3 to the recording section 50. In the present embodiment, the first control board 3 is the above described main board, and the second control board 4 is the above described drive board (DRV board).

The recording section 50 and the second control board 4 are electrically connected to each other by a wiring section 7. The posture of the wiring section 7 changes as the recording section 50 moves reciprocally in the X-axis direction. The second control board 4 is disposed in a no displacement portion 8 where posture is not changed even when the recording section 50 of the wiring section 7 is moved.

In this embodiment, the second control board 4 generates a second signal, for example, the drive signal indicating how much rotation of a motor (not shown) as a drive source is required to move the recording section 50 to the position, based on a first signal from the first control board 3, for example, the drive signal indicating at which timing and at which position the recording section 50 should be positioned. The first control board 3 and the second control board 4 generate the drive signal under the control of a control section (not shown).

The control section includes a CPU, a flash ROM, and a RAM. The CPU performs various calculation processes according to a program stored in the flash ROM and controls the operation of the entire recording device 1. The flash ROM, which is an example of the storage unit, is a non-volatile memory that can be read from or written into. Various kinds of information are temporarily stored in the RAM, which is an example of the storage unit.

Wiring Section

Figure 4:
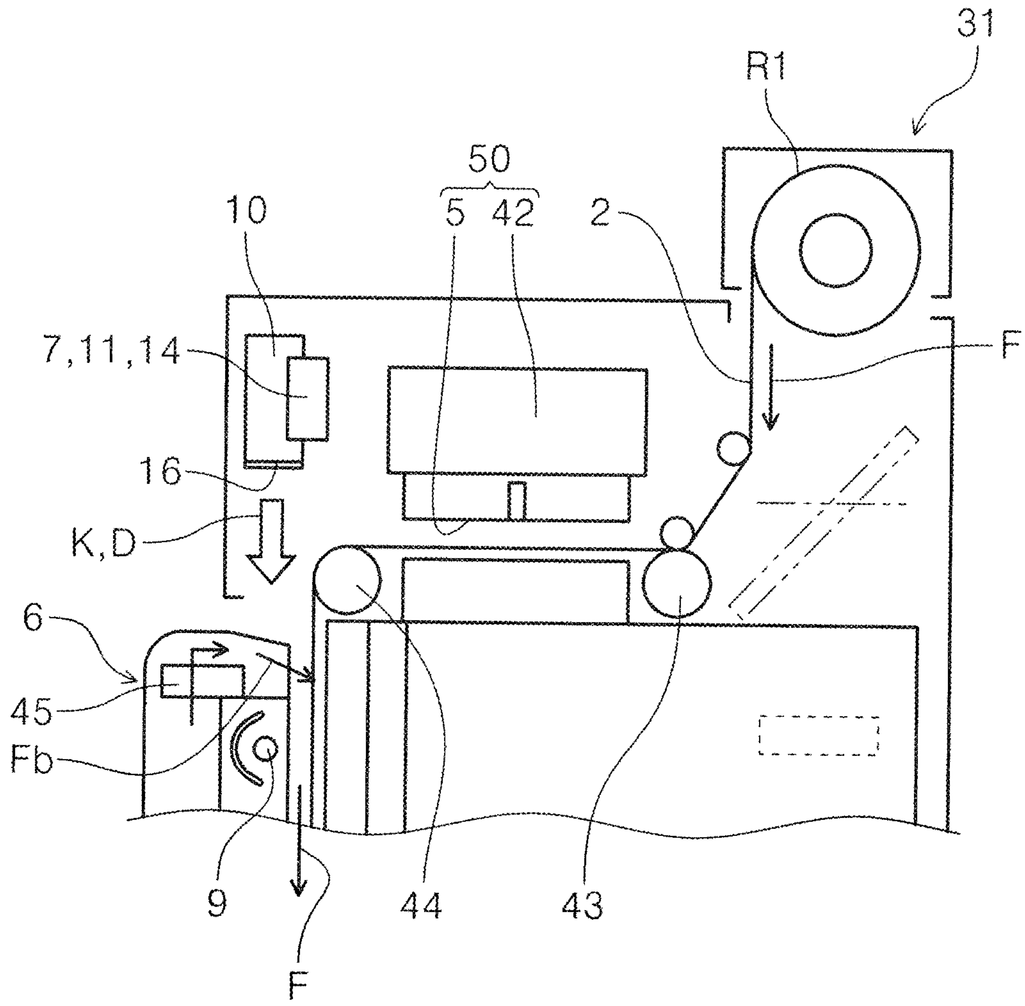
FIG. 4 is a schematic side cross-sectional view of a main part of the recording device according to the first embodiment.

The recording section 50 includes a recording head 5 and a carriage 42 (FIG. 4). The recording head 5 moves reciprocally in the X-axis direction with the carriage 42.

Figure 2:
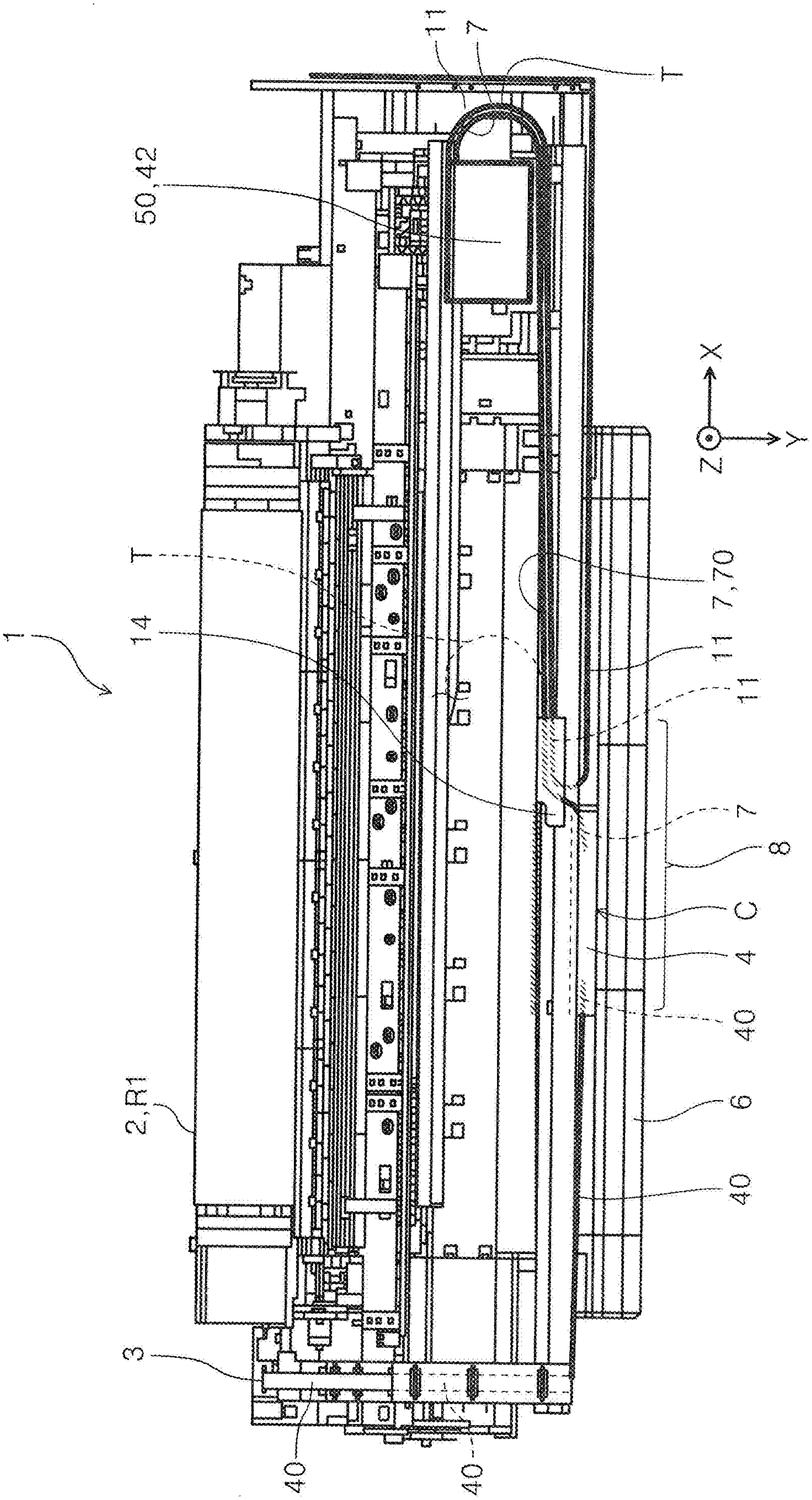
FIG. 2 is a plan view of the recording device according to the first embodiment.

As the wiring section 7, a flexible flat cable where posture can be changed in accordance with the movement of the recording section 50 is used. The wiring section 7 is connected to the recording section 50 via a U-shape portion T (FIG. 2). An end portion of the wiring section 7 on the side opposite to the recording section 50 is held, that is, fixed in place, by a fixing section 14 forming the no displacement portion 8. The second control board 4 is connected to a portion 70 (FIG. 2) extending from the fixing section 14 of the wiring section 7 toward the first control board 3. In other words, the second control board 4 is disposed in the vicinity of the fixing section 14.

The first control board 3 and the second control board 4 are connected by a connection line 40 (FIG. 2). Here, a flexible flat cable is also used for the connection line 40.

As shown in FIG. 2, when the recording section 50 moves reciprocally in the X-axis direction, the U-shape portion T of the wiring section 7 moves. The wiring section 7 changes its posture by the movement of the U-shape portion T, with the fixing section 14 as a base point position. The U-shape portion T is an example of a displacement portion.

As shown in FIG. 4, in the present embodiment, a roll body R1 of the medium 2 is rotatably supported by a feeding shaft of the feeding section 31. The medium 2 pulled out from the roll body R1 is transported in the recording range of the recording section 50 by an intermediate roller 43 and an intermediate roller 44 constituting the transport path. Further, the medium P is transported in a heating range of a heating section 6 disposed at a downstream position in the transport direction F from the intermediate roller 44.

As shown in FIG. 1, the medium 2 dried by the heating section 6 is guided in the direction of a winding section 32 by a guide bar 34 (FIG. 1) and is wound in the winding section 32. In FIG. 1, in the winding section 32, a roll body for winding is axially supported on a winding shaft 36, but the drawing of the roll body for winding is omitted here. In FIG. 1, reference symbol 37 denotes a leg section of the recording device 1.

Heating Section

Figure 3:
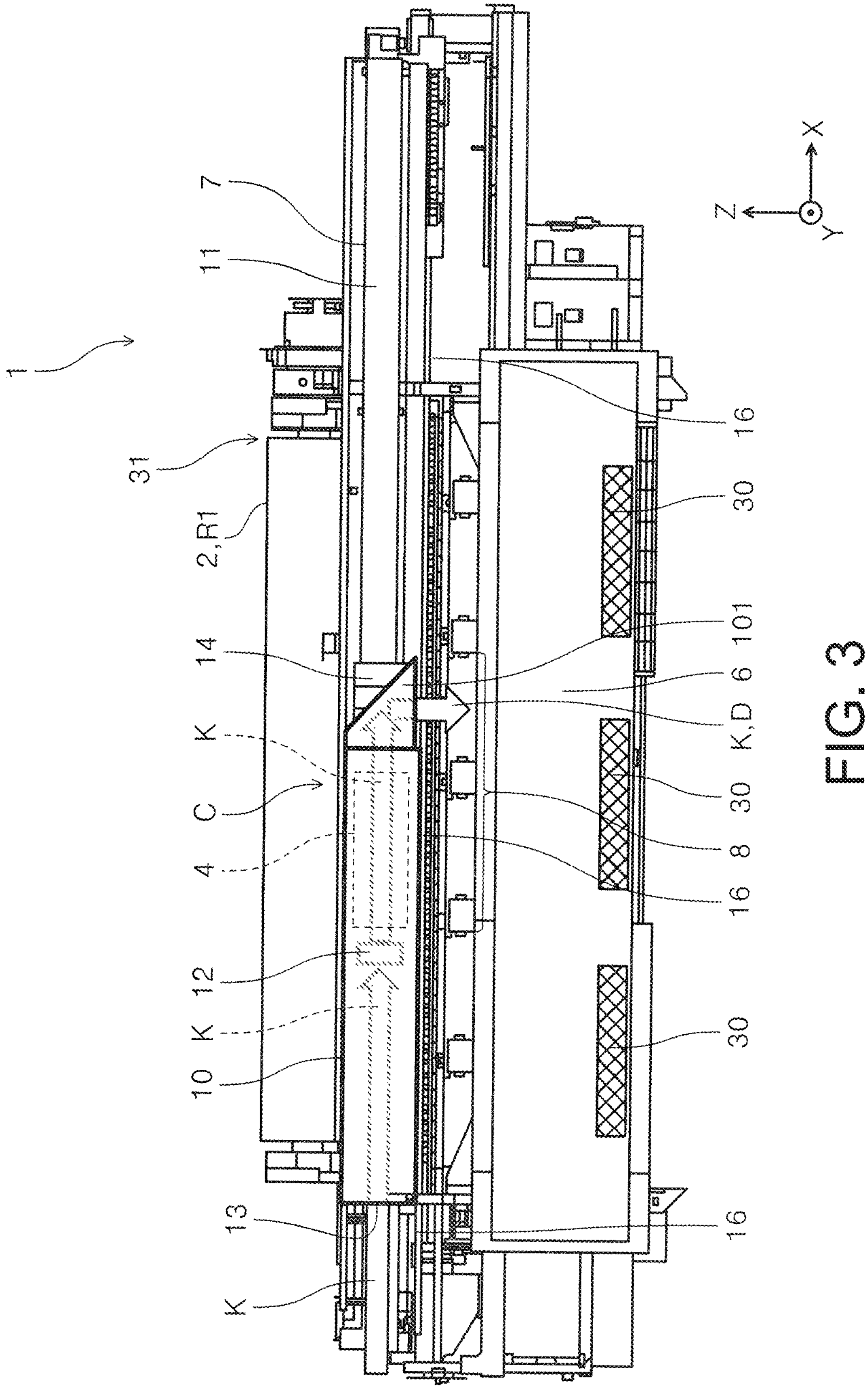
FIG. 3 is a front view of the recording device according to the first embodiment.

As shown in FIG. 3 and FIG. 4, as described above, the recording device 1 of the present embodiment includes the heating section 6 for heating the medium 2 on which recording has been performed by the recording section 50.

As shown in FIG. 4, the heating section 6 includes a heater 9. The heater 9 is a heat source that heats the medium 2 to dry the ink ejected from the recording head 5.

The heating section 6 includes a fan 45 on the opposite side of the medium 2 with respect to the heater 9. As shown in FIG. 1 and FIG. 3, the heating section 6 further includes an intake port 30 for taking in external air. The external air is sucked from the intake port 30 by the fan 45, further sent by the fan 45, and finally blown out in an outlet direction Fb.

As shown in FIG. 4, the outlet direction Fb is obliquely downward. The air blown out in the outlet direction Fb hits the medium 2, flows downward along a surface of the medium 2, and promotes drying of the ink.

As shown in FIG. 1 to FIG. 3, in the present embodiment, the length of the heating section 6 in the width direction (X-axis direction) is configured to be a length that can cover the entire width of the medium 2. That is, it is configured to be able to dry the entire width direction of medium 2. Three intake ports 30 are provided at equal intervals in the X-axis direction.

Duct

Further, the recording device 1 is provided with a duct 10 that communicates with the outside air and that includes a fan 12. The duct 10 is disposed above the heating section 6. The duct 10 includes an opening 13. The duct 10 communicates with outside air via the opening 13. By the fan 12 operating, the outside air is sucked into the duct 10 through the opening 13.

The second control board 4 is disposed inside the duct 10. The air sent by the fan 12 flows through the duct 10 and is discharged downward D from an outlet section 101. In the present embodiment, as shown in FIG. 2, the second control board 4 is disposed so as to overlap at least a part of the heating section 6 in the vertical direction (Z-axis direction).

In FIG. 3, reference symbol K denotes the flow of air in the duct 10. The air sucked in from the opening 13 by the fan 12 cools the second control board 4 and is discharged downward D from the outlet section 101.

As shown in FIG. 1 to FIG. 3, in the present embodiment, the second control board 4 is disposed at a center C of a range in which the recording section 50 moves reciprocally.

The center C does not have to be strictly in the center. As shown in FIG. 2 and FIG. 3, in the present embodiment, the second control board 4 is disposed slightly to the left of the exact center. The center C is also the center in the X-axis direction, which is the width direction of the recording device 1.

As shown in FIG. 1 to FIG. 3, in the present embodiment, an ink tube 11 for supplying ink to the recording section 50 is connected to the recording section 50. The ink tube 11 is fixed in position at the no displacement portion 8.

Specifically, as shown in FIG. 2, the ink tube 11 is held and fixed by the fixing section 14. The ink tube 11 is configured such that a portion between the no displacement portion 8 and the recording section 50, that is, a portion between the fixing section 14 and the recording section 50, changes its posture together with the wiring section 7 in accordance with the movement of the recording section 50. Note that a base end of the ink tube 11 is connected to an ink tank (not shown).

As shown in FIG. 3 and FIG. 4, in the present embodiment, a heat insulating material 16 is disposed between the second control board 4 and the heating section 6. Here, the heat insulating material 16 is disposed on a bottom surface of the duct 10. The heat insulating material 16 is configured to be longer than the length of the heating section 6 in the X-axis direction. Note that since the purpose of the heat insulating material 16 is to suppress heat from the heating section 6 from being transmitted to the second control board 4, the installation position and shape may be appropriately changed within the scope of that purpose.

As shown in FIG. 1 to FIG. 4, in the present embodiment, the second control board 4 is disposed on the front surface side (+Y side) of the recording device 1. In other words, the second control board 4 is disposed at a position downstream of the recording section 50 in the transport direction F. That is, the second control board 4 is provided above the heating section 6 at a position accessible from the front side of the recording device 1. This is in consideration of accessibility when replacing and the like of the second control board 4.

Description of Operation of First Embodiment

The drive signal transmitted from the first control board 3 is relayed by the second control board 4, which is fixed in a position that is close to the recording section 50 and that is not displaced, and is transmitted to the recording section 50.

The recording section 50 receives the drive signal and performs recording by ejecting ink while reciprocally moving in the width direction (X-axis direction) of medium 2.

The posture of the wiring section 7 changes as the recording section 50 moves reciprocally. Since the second control board 4 is disposed in the no displacement portion 8, which is not affected by the change in posture of the wiring section 7, the second control board 4 does not hit anything while the wiring section 7 moves and changes posture. Since the recording section 50 exists independently of the second control board 4, there is no increase in weight and no increase in size.

Description of Effects of First Embodiment (1) In the present embodiment, the second control board 4 is disposed in the no displacement portion 8 where the posture does not change even when the recording section 50 of the wiring section 7 moves. As a result, since the second control board 4 is not disposed on the carriage 42 that moves the recording head 5, it is possible to suppress an increase in the size of the recording head 5 portion. The second control board 4 is disposed in the no displacement portion 8 where the posture of the wiring section does not change even when the posture of the wiring section 7 is repeatedly changed due to the reciprocal movement of the recording head 5. That is, the second control board 4 is disposed at a position where the posture of the wiring section 7 does not change. As a result, it is possible to prevent the wiring section 7 from colliding with the second control board 4 due to the reciprocal movement of the recording section 50, thereby preventing it from being broken down.

(2) In the present embodiment, the second control board 4 is disposed inside the duct 10 positioned above the heating section 6, and the air sent by the fan 12 is discharged downward D where the heating section 6 is disposed. As a result, it is possible to cool the heating section 6 positioned on the downward D, and it is possible to suppress an increase in the temperature of an outer surface of the heating section 6. As a result, when the user works while standing on the front surface side (+Y side) where the heating section 6 is positioned, it is possible to suppress the difficulty in working due to an increase in the temperature of the outer surface of the heating section 6.

Since the air sent by the fan 12 is discharged downward D, the air can play an auxiliary role in drying the medium 2.

Since the second control board 4 is disposed inside the duct 10, there is little possibility of ink mist adhering thereto and contaminating.

(3) In the present embodiment, the second control board 4 is disposed at the center C of the range in which the recording section 50 moves reciprocally. The center C is a position closest to the recording head 5 in the range in which the recording head 5 moves reciprocally. As a result, attenuation of the drive signal transmitted from the second control board 4 via the wiring section 7 can be suppressed.

(4) In the present embodiment, in the ink tube 11, the position is fixed in the no displacement portion 8, and the posture is changed together with the wiring section 7 in accordance with the movement of the recording section 50 at a portion between the no displacement portion 8 and the recording section 50. As a result, it is possible to use the no displacement portion 8 also as a base end section of the ink tube where posture is not changed, the posture of the ink tube 11 being changed due to the reciprocal movement of the recording section 50.

(5) In the present embodiment, it is possible to prevent the heat from the heating section 6 from being transmitted to the second control board 4 by using the heat insulating material 16.

(6) In the present embodiment, since the second control board 4 is disposed on the front surface side of the recording device 1, it is easy to access the second control board 4 when the second control board 4 is replaced.

Other Embodiments

Although recording device 1 according to the present disclosure basically has the configuration of the above described embodiment, it is of course possible to change or omit the partial configuration within the scope not departing from the gist of the present disclosure.

In the above described embodiment, the case where the first control board 3 is the main board and the second control board 4 is the drive board (DRV board) has been described, but the present invention is not limited thereto. The second control board 4 may be any substrate that requires a cooling fan.

What is claimed is:

1. A recording device comprising:
a recording section configured to perform recording on a medium while making reciprocal movement in a width direction, which intersects a transport direction of the medium;
a first control board configured to control an operation of the recording section;
a second control board that is disposed between the first control board and the recording section and that is configured to relay a signal from the first control board; and
a wiring section that is configured to electrically connect the recording section and the second control board and that includes a displacement portion whose posture changes in accordance with the movement of the recording section and a no displacement portion whose posture does not change in accordance with movement of the recording section, wherein
the second control board is disposed at the no displacement portion.

2. The recording device according to claim 1, further comprising:
a heating section configured to heat the medium on which recording was performed by the recording section and
a duct that communicates with outside air, that includes a fan, and that is positioned above the heating section, wherein
the second control board is disposed inside the duct and the air sent by the fan is discharged downward.

3. The recording device according to claim 1, wherein
the second control board is disposed at the center of a range in which the recording section moves reciprocally.

4. The recording device according to claim 1, further comprising:
an ink tube that is connected to the recording section and that is configured to supply ink to the recording section, wherein
the ink tube
is fixed at the no displacement portion and changes posture together with the wiring section in accordance with the movement of the recording section at a portion between the no displacement portion and the recording section.

5. The recording device according to claim 1, further comprising:

a heat insulating material disposed between the second control board and the heating section.

6. The recording device according to claim 1, wherein the second control board is disposed on a front surface side of the recording device.

* * * * *